Figure 1:
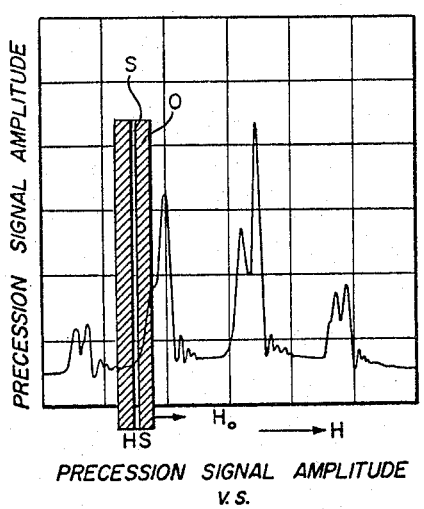

Nov. 22, 1966 R. H. VARIAN 3,287,629
GYROMAGNETIC RESONANCE METHODS AND APPARATUS
Original Filed Aug. 29, 1956 3 Sheets-Sheet 1

PRECESSION SIGNAL AMPLITUDE
V.S.
MAGNETIC FIELD INTENSITY FOR HYDROGEN NUCLEI IN THE $CH_2$ GROUP OF $CH_3 CH_2 OH$ APPLYING A CONSTANT $\omega$ INVENTOR.
Russell H. Varian
BY
Harry E. Aine
Attorney

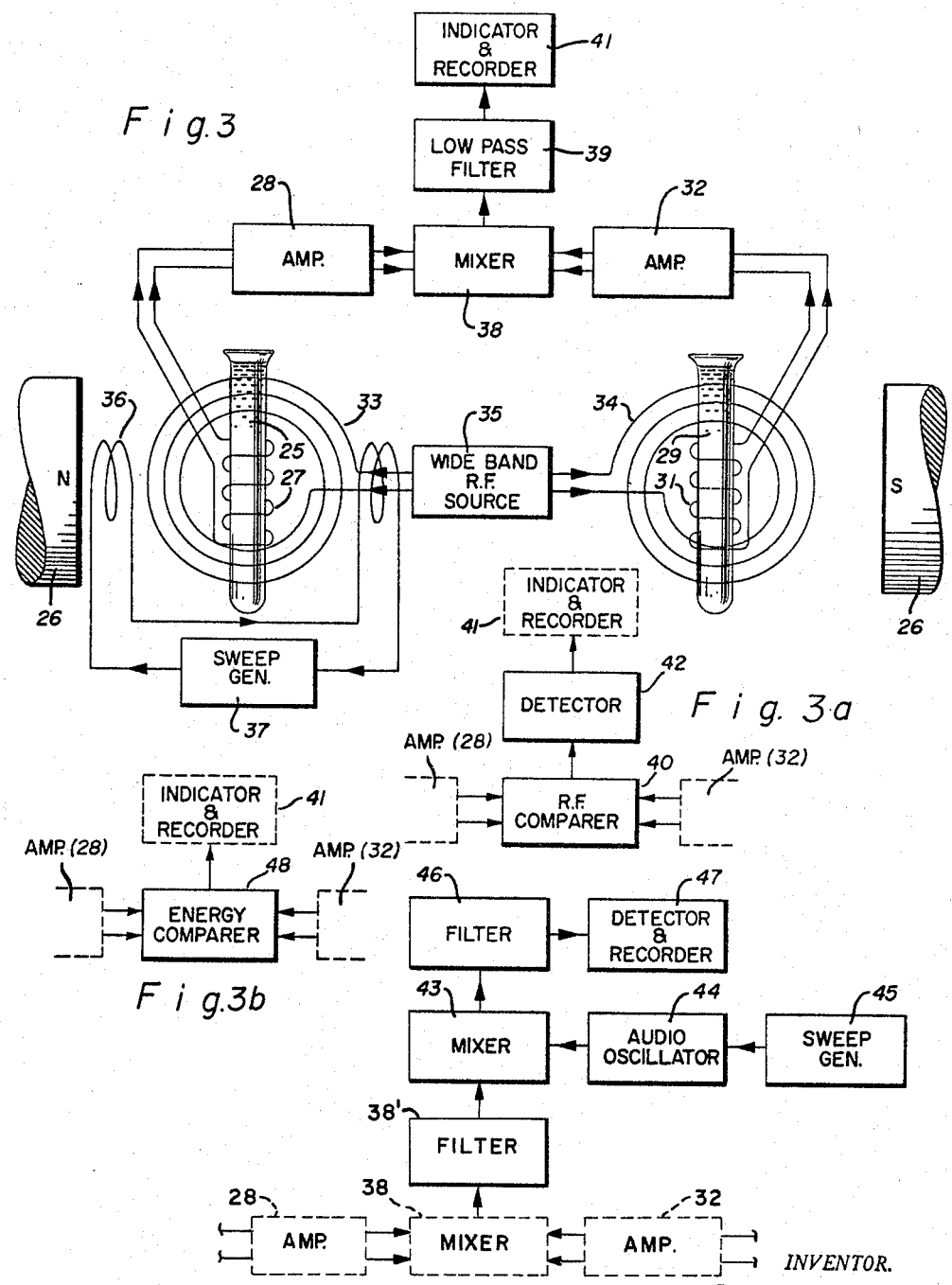

INVENTOR.
Russell H. Varian
BY
Harry E. Aine
Attorney

United States Patent Office 3,287,629
Patented Nov. 22, 1966

3,287,629
GYROMAGNETIC RESONANCE METHODS AND APPARATUS
Russell H. Varian, Cupertino, Calif., assignor to Varian Associates, San Carlos, Calif., a corporation of California
Original application Aug. 29, 1956, Ser. No. 606,820. Divided and this application July 15, 1963, Ser. No. 301,225
21 Claims. (Cl. 324—.5)

The present invention is a divisional application of my copending application U.S. Serial No. 606,820 filed August 29, 1956, now issued as U.S. Patent No. 3,109,138 on October 29, 1963, and relates in general to gyromagnetic resonance methods and apparatus and more specifically to novel improved extremely stable high resolution methods and apparatus for obtaining reliable and precise gyromagnetic data used by chemists, physicists and industry to interpret molecular structures, to determine component percentages of substances, to control processes and to accomplish many other important tasks.

The present invention is applicable to gyromagnetic resonance in general and applies to all bodies which possess the properties of magnetic moment and angular momentum, such as, for example, nuclei (nuclear magnetic resonance), electrons (electron paramagnetic resonance), quadrupole nuclei (quadrupole resonance) and the like.

Heretofore a high resolution nuclear magnetic resonance spectrum was typically obtained in the following manner: the sample of matter to be analyzed such as, for example, ethyl alcohol ($CH_3CH_2OH$) was placed within a suitable holder and inserted between the pole faces of a powerful magnet producing a D.C. magnetic polarizing field $H_0$ of, for example, 7,500 gauss. The dynamic factor necessary for the spectrum was obtained by superimposing a small very low frequency magnetic sweep field $H_s$ upon the D.C. polarizing field $H_0$. A fixed frequency radio frequency magnetic field $H_1$ was applied to the sample through a transmitter coil at an angle of 90° to the direction of the polarizing field $H_0$. The action of the R.F. field $H_1$ on the nuclei of the sample, when the R.F. was at the Larmor frequency $\omega = \gamma H$ (where $\gamma$ is the gyromagnetic ratio, and H is the total magnetic field intensity equal to $H_0 + H_s$), is to produce a phase-coherent forced precession of the nuclei. A receiver coil surrounding the sample normal to the transmitter coil had induced therein, by the precessing nuclei, an alternating signal voltage at the forced precessional frequency (Larmor frequency). The precessional signal was then amplified and detected to produce a D.C. signal voltage proportional to the amplitude of the forced precessions. It will be noted that a high amplitude D.C. signal corresponds to resonance of a particular group of gyromagnetic bodies and will be obtained only at precisely the correct combination of $\omega$ and total field intensity H.

Assuming that a spectrum of the hydrogen nuclei in $CH_3CH_2OH$ is being obtained in the polarizing field $H_0$ of 7,500 gauss the entire spectrum will be approximately 30 milligauss long.

In order to achieve high resolution without producing ringing of the high Q nuclei (shock excitation of the gyromagnetic bodies or resonators produces transient oscillations which will interfere with the resolution of the spectrum) it is necessary to sweep (vary H in a prescribed manner by varying $H_s$) through the spectrum at a slow rate. This high resolution sweep rate is substantially proportional to the square of the narrowest line width encountered in the spectrum. A representative high resolution sweep speed for the hydrogen nuclei spectrum of ethyl alcohol ($CH_3CH_2OH$) in a 7,500 gauss field would be approximately 0.8 milligauss per minute. Using this sweep speed a total sweep time of approximately 35 minutes is required to sweep through the entire ethyl alcohol spectrum. This length of sweep time requires that the time stability of the apparatus remain within one part in $10^8$ for the length of the sweep period, in this case 35 minutes. Heretofore, what this has meant more specifically was that the frequency $\omega$ of the alternating field $H_1$ must remain constant within one part in $10^8$ and the D.C. total field H must remain controlled within one part in $10^8$ for the sweep period.

These stability requirements have necessitated the use of extremely well regulated D.C. magnet power supplies when electromagnets are used, extremely stable crystal controlled oscillators and, recently, superstability (magnetic field control) coils all of which have contributed a considerable proportion of the total cost of high resolution equipment.

In the present invention resonance is excited in a gyromagnetic substance disposed within a polarizing field $H_0$ or a polarizing field $H_0$ subject to substantially the same fluctuations with time as the polarizing field $H_0$ applied to a sample under investigation. The gyromagnetic resonances of the substances will then vary in a like manner such that when they are compared minute fluctuations of the individual resonances due to the fluctuations of the polarizing field or other common environment are not observed because the two compared resonances have varied alike such that the differences, if any, in the resonances remains constant. In this manner the time stability and thus the resolution of the gyromagnetic apparatus is greatly enhanced.

The principal object of the present invention is to provide novel, improved and simplified gyromagnetic resonance methods and apparatus whereby the time stability of the apparatus may be greatly enhanced and whereby previously used costly components may be eliminated.

One feature of the present invention is a novel means for obtaining control of processes wherein the gyromagnetic substance which is subject to a polarizing field and which it is desired to monitor is caused to pass through the coupled portions of the input-output networks of a gyromagnetic oscillator and a process control signal is derived from the electrical condition of the gyromagnetic oscillator and associated networks.

Another feature of the present invention is a novel method and apparatus for observing the gyromagnetic properties of matter wherein resonance is excited in a plurality of gyromagnetic samples and the resonances compared whereby enhanced stability and resolution is obtained.

Another feature of the present invention is a novel method and apparatus for comparing resonances of a plurality of gyromagnetic samples wherein the resonances are added or substracted, as desired.

Another feature of the present invention is a novel method and apparatus for comparing gyromagnetic resonances of a plurality of samples wherein the resonances are heterodyned with each other and with a low variable frequency reference signal.

Another feature of the present invention is the provision of a gyromagnetic resonance spectrometer which excites and receives simultaneous resonance line signals of a sample under analysis and frequency analyzes the received signal to give a measure of the separate resonance line components, whereby resonance time can be reduced for a given signal-to-noise ratio.

Another feature of the present invention is a novel method and apparatus for improving the sensitivity of signal measurements wherein the signal is recorded for a certain length of time thereby facilitating a more rapid high resolution analysis of the signal under measurement.

Another feature of the present invention is a novel method and apparatus for providing an enhanced sensitivity of signal measurements wherein the recorded signal is Fourier analyzed to thereby facilitate a subsequent integration of the various components of the recorded signal.

Still another feature of the present invention is the provision of a novel method and apparatus for improving the sensitivity of signal measurements wherein the various Fourier components of the signal are integrated to thereby obtain an enhanced signal-to-noise ratio for the signal under measurement.

Figure 2:
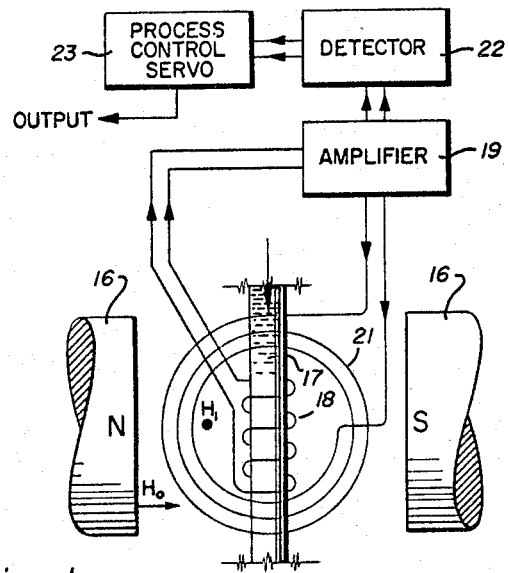
Figure 5:
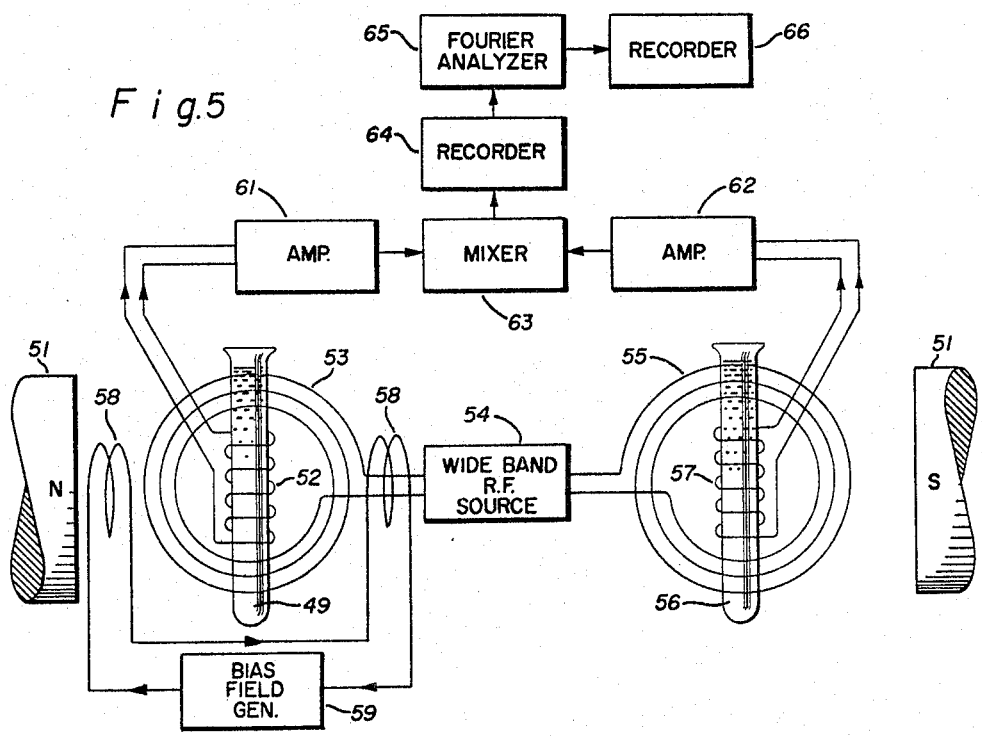
Figure 6:
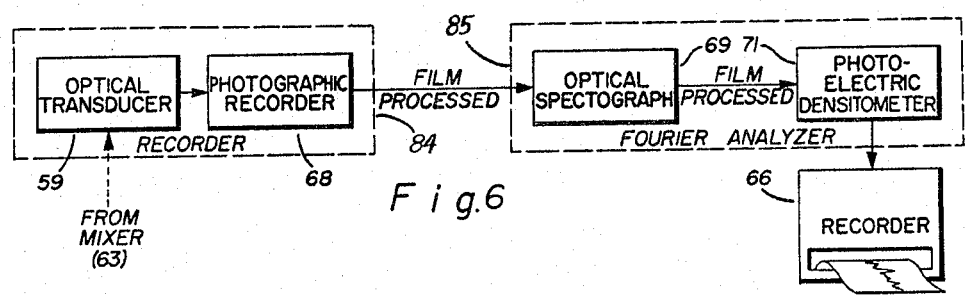
Figure 7:
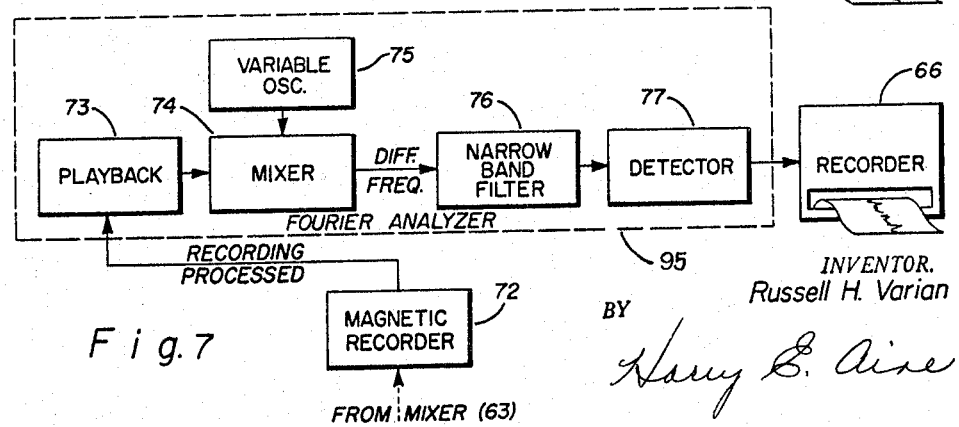

Other features and advantages of the present invention will become apparent after a perusal of the following specification as taken in connection with the accompanying drawings wherein, FIG. 1 is a replica of a nuclear magnetic resonance spectrum trace of the hydrogen nuclei in the $CH_2$ group of ethyl alcohol ($CH_3CH_2OH$) obtained in a 7,500 gauss polarizing field, FIG. 2 is a schematic block diagram of a novel gyromagnetic resonance process control apparatus which embodies the present invention, FIGS. 3, 3a and 3b is a schematic block diagram of another novel gyromagnetic resonance spectrometer embodiment of the invention, FIG. 4 is a schematic block diagram of still another novel gyromagnetic resonance spectrometer embodiment, FIG. 5 is a schematic block diagram of another novel gyromagnetic resonance spectrometer, FIG. 6 is a schematic block diagram of a portion of the apparatus of FIG. 5, and FIG. 7 is a schematic block diagram of a portion of the apparatus of FIG. 5.

Referring now to FIG. 1, the gyromagnetic resonance signal that is detected and recorded, as a trace, at any instant of time can be thought of as what one would see if he could look at the true gyromagnetic resonance spectrum through a very narrow slot S in an otherwise opaque slider O that is caused to slide directly over the spectrum at the sweep rate. In this manner it is easy to see what happens, to what would otherwise be an accurate and high resolution spectrum, if the slider begins to travel at a nonuniform rate over the spectrum. If a small slow fluctuation is superimposed on the slider sweep rate, portions of the spectrum will be lengthened or shortened in accordance with the fluctuation. If a rapid fluctuation is superimposed upon the steady slider rate an extremely low resolution, blurred, spectrum is obtained. This slider-spectrum idea is exactly analogous to what takes place when either the frequency $\omega$ of the applied magnetic field $H_1$ or the intensity of the polarizing field $H_o$ varies unintentionally, as by a transient present in the magnet power supply leaking through the power supply regulator and manifesting itself as a fluctuation in the polarizing field intensity $H_o$.

It will be noted that the distortion introduced in the observed spectrum is caused by the nonuniform rate of change in the ratio of $\omega/H$. This is important because the present invention provides methods and means for preventing nonuniform rate of change in the $\omega/H$ ratio thereby greatly increasing the precision and resolution of the gyromagnetic resonance system.

Henceforth, the term "gyromagnetic oscillator" shall be defined to mean an amplifier having an input and output circuit regeneratively coupled together through the intermediary of a gyromagnetic substance. Thus, minute fluctuations in the polarizing field intensity $H_o$, where a magnetic polarizing field is used, cause corresponding fluctuations in the frequency $\omega$ of the gyromagnetic oscillator.

Another embodiment of the present invention is shown in FIG. 2. A magnet 16 produces a polarizing magnetic field $H_o$. A sample of matter 17 to be analyzed or monitored, as in a process control apparatus, is caused to be subjected to the polarizing magnetic field $H_o$ as by, for example, flowing through the polarizing field $H_o$. A receiver coil 18 is positioned around the sample path with its axis at right angles to the direction of $H_o$. The receiver coil is coupled to the input of an amplifier 19. The output of the amplifier 19 is coupled to a transmitter coil 21 which is positioned at right angles to both the direction of $H_o$ and the axis of the receiver coil 18.

Thus, the input and output networks of the amplifier 19 are regeneratively coupled together substantially only by the gyromagnetic bodies, if any, contained within the sample 17 thereby forming a gyromagnetic oscillator. A detector 22 receives energy at the precessional frequency from the amplifier 19 and produces a D.C. voltage signal which is a measure of the sample under analysis. The D.C. signal may then be fed to a process control servomechanism 23 for controlling the process in the desired manner and/or fed to an indicator for indicating a property of the substance under analysis, for example, moisture content.

In operation, the novel process control or sample analysis method and apparatus derives an alternating precessional signal from the gyromagnetic oscillator, the amplitude of which is proportional to the number of gyromagnetic bodies passing through the receiver coil 18. The alternating precessional signal is detected to produce a D.C. voltage proportional to the amplitude of the precessional signal which may then be fed to the process control servo 23 for controlling the process accordingly.

Referring now to FIG. 3, there is shown another embodiment of the present invention. A first sample of gyromagnetic matter 25 is placed within a strong D.C. polarizing magnetic field produced by magnet 26. A detector coil 27 is positioned in surrounding relationship to the first sample of matter 25 and is coupled to the input of an amplifier 28. A second sample of matter 29 under analysis and which may contain gyromagnetic bodies is disposed within the same D.C. polarizing magnetic field or a D.C. polarizing field subject to the same minute time fluctuations as said first D.C. magnetic field. A second detector coil 31 is positioned around the second sample of matter 29 and is coupled to the input of an amplifier 32. A first transmitter coil 33 and a second transmitter coil 34 are disposed adjacent the samples of matter 25 and 29 respectively and are coupled to the same relatively wide band radio frequency source 35 with a bandwidth of about 1,000 cycles in 30,000,000–60,000,000 cycles.

The wide band frequency source 35 serves to provide signals of the same phase to both samples of matter 25 and 29. The wide band frequency source 35 may comprise, for example, a pulse generator wherein the pulses are regulated to give Fourier components over the desired frequency range or a white noise source having the required bandwidth.

A pair of sweep coils 36 are provided straddling one of the samples, for example, sample 25. A sweep generator 37 supplies a sweep current to coils 36 to thereby sweep the total magnetic field applied to the sample by superimposing a small bias field $H_s$ upon the existing D.C. polarizing field.

In operation a relatively wide band R.F. signal containing electromagnetic energy of substantially all frequencies in the neighborhood of any possible gyromagnetic resonance frequency of bodies within the samples of matter 25 and 29 is simultaneously applied via transmitter coils 33 and 34 to both samples of matter 25 and 29. The wide band signal serves as the driving electromagnetic field at the Larmor frequencies of the various groups of the gyromagnetic bodies within the samples and thus produces simultaneous forced precession on resonance of all the gyromagnetic bodies within both samples of matter. Thus, there will be produced within both samples of matter gyromagnetic resonance spectra of the gyromagnetic bodies contained within the respective samples.

Assume now for the sake of explanation that both samples 25 and 29 contain identical substances and therefore have identical spectrums, when the polarizing field strength applied to both samples of matter is equal. Moreover, since the driving signals derived from the relatively wide band frequency source 35 is in phase as applied to both the samples 25 and 29 the forced precession or resonance signals will be in phase in both samples of matter.

The received R.F. spectra (resonance signals picked up by detector coils 27 and 31) originating from the two samples, after amplification, are simultaneously applied to and heterodyned in a mixer 38. The output of the mixer 38 will contain sum and difference frequencies of the two input signals. The difference frequencies are selected by the low pass filter 39 and the D.C. component recorded by the indicator 41. When the two R.F. spectra are in coincidence the difference frequencies for each of the separate R.F. components will be zero or D.C. Thus, when the two spectra come into coincidence a very large D.C. signal will be passed by filter 39 and recorded by the indicator 41.

It will be noted that if the two samples of matter have a different magnetic field applied to each, their spectrums will be displaced in frequency. Therefore, when the precession signals are applied to the mixer 38 they will not produce a maximum D.C. signal output. By the superposition of a small sweep field $H_s$ upon one of the samples one of the spectrums may be swept in frequency with respect to the other. When this is done at precisely the moment when the respective spectrums from samples 25 and 29 coincide in frequency, corresponding to identical total field over both samples, a large D.C. signal will be obtained from the mixer 38 and indicated and recorded on the indicator recorder 41.

Referring now to FIG. 3a there is shown an alternative apparatus for comparing the spectrums originating from the separate samples of matter 25 and 29. In this embodiment the mixer 38 is replaced by an R.F. comparer 40 for adding or subtracting, as desired, the various R.F. components of the individual spectrums. The R.F. comparer 40 may comprise, for example, a tank circuit having the R.F. outputs of amplifiers 28 and 32 coupled to add or subtract, as desired, in the tank. When the separate spectrums coincide in frequency the R.F. amplitude of oscillation in the tank circuit or R.F. comparer will be a maximum or minimum depending whether the spectrums are added or subtracted. The R.F. is then detected by a detector 42 and indicated and recorded in the indicator and recorder 41.

An advantage of the features embodied in FIGS. 3 and 3a lies in the signal enhancement produced by the simultaneous reenforcement of all the various components or lines of the individual spectrums at precisely the point of frequency coincidence of the separate gyromagnetic spectrums. It is true that D.C. signals will be produced when single lines of the separate spectrums come into frequency coincidence, however, this D.C. signal will be small compared to the D.C. signal obtained when all the resonant lines of both spectrums come into coincidence and thus may easily be interpreted.

Referring now to FIG. 3b there is shown another alternative apparatus for comparing the spectrums. In this embodiment the mixer 38 and low pass filter 39 of FIG. 3 are replaced by an energy comparer 48 for comparing the energy of the separate spectrums. The energy comparer 48 may comprise, for example, a dual R.M.S. voltmeter arranged to give a signal proportional to the sum or difference, as desired, of the energy of the separate spectrums. The output of the energy comparer is then fed to the indicator and recorder 41 wherein it is recorded and indicated to give a measure of the substance under analysis. In this embodiment the same energy differential will be observed irrespective of the frequency differences of the two spectrums as the energy of each spectrum is not a function of frequency.

It will be noted in the present embodiment of FIG. 3b that it is possible to obtain an erroneous reading if both detector coils 27 and 31 are detecting the same general noise level instead of gyromagnetic signals. In this case the energy differential from the comparer 48 would be zero indicating identical samples. However, the sweep generator may be operated to periodically sweep the resonant frequencies of one of the samples out of the broadband range of frequencies supplied by broadband source 35. If an indication appears on indicator and recorder 41 corresponding to this periodic sweep then it is apparent that the spectrometer is comparing the energy difference between gyromagnetic spectra and not noise.

An alternative to sweeping the magnetic field for determining whether the spectrometer of FIG. 3b was operating properly would be to periodically displace the sample within the detector coil, such as, for example, by periodically causing bubbles of air or other gaseous material to pass through the detector coil.

Exemplary uses of the foregoing embodiments shown in FIGS. 3 and 3a include: For analysis of substances; a known reference material may be placed in one of the detector coils and an unknown sample placed in the other detector coil. Then the reference spectrum may be swept in frequency with respect to the unknown sample spectrum. In this manner the spectrums are compared and the results are recorded. If the unknown sample contains the known reference material, then at one point in the sweep the reference spectrum will coincide with that portion of the corresponding portion of the spectrum originating within the unknown material thus producing a large D.C. signal which will be recorded and indicated as a single line.

Another use for the embodiment shown in FIGS. 3, 3a and 3b includes a process control application wherein the desired product is used as a reference sample and a portion of the process is caused to be passed through the unknown detector coil. Then if the substance making up a portion of the process varies in composition this will become immediately apparent as a change in the size of the D.C. signal output appearing on the recorder 41. This indication may be utilized to operate a process control servomechanism for correcting the process, flashing a warning light or the like.

Another embodiment of the present invention is shown in FIG. 4. In this embodiment the apparatus of FIG. 3 corresponding to the mixer 38 (low pass filter) 39, and indicator and recorder 41 are replaced by the apparatus of FIG. 4 such that the entire apparatus, which has not been shown in FIG. 4, includes most of the apparatus of FIG. 3 plus the substituted elements of FIG. 4. In this embodiment the reference sample corresponding to sample 25 of FIG. 3 is selected to have only a single gyromagnetic resonance such as, for example, hydrogen nuclei of water. The unknown sample 29 which it is desired to analyze is placed within the detector coil 31. As described above with relation to FIG. 3 there will be produced two simultaneous resonance spectra, one for each sample of matter. These resonance spectra are detected and fed to amplifiers 28 and 32 wherein the R.F. signals are amplified and thence fed to mixer 38.

The resonance frequency of the reference sample 25 is adjusted such that it lies outside of the gyromagnetic spectrum of the unknown sample 29. Thus, there will be produced in the output of mixer 38 a plurality of beat frequencies corresponding to the sum and difference frequencies between the reference resonance signal and the corresponding resonant frequencies making up the gyromagnetic spectrum of the unknown sample 29.

One of the beat frequency side bands is selected as by suitable filter means 38' and fed to a second mixer 43 wherein the side band is mixed with the output from a variable frequency audio oscillator 44. The audio oscillator 44 is frequency modulated by a sweep generator 45. When the beat frequency single side band signals from mixer 38 are mixed with the variable audio signal from audio oscillator 44 there will be produced in the output of mixer 43 sum and difference frequencies. The frequency of the audio oscillator 44 is displaced from the expected beat spectrum to produce a convenient difference frequency such as, for example, 500 c.p.s. when heterodyned with the first expected beat frequency signal of the beat spectrum.

The output of second mixer 43 is fed to a narrow pass band filter 46 designed to pass only the difference frequency between the gyromagnetic resonance signal and the frequency of the audio oscillator 44. The output of filter 46 is fed to a detector and recorder 47 which detects the amplitude of the 500 cycle signal to produce a D.C. signal, the magnitude of which is recorded as a function of audio oscillation frequency and/or time, as desired, to thereby obtain a spectrum of the substance under analysis.

The frequency of the audio oscillator is swept in frequency starting from an initial frequency such as to produce the difference frequency of 500 cycles when heterodyned with the first expected gyromagnetic resonance signal of the gyromagnetic resonance spectrum. In this manner the gyromagnetic resonance spectrum is searched at the sweep rate determined by sweep generator 45.

Although two separate heterodyning devices have been shown in the drawings it is possible to obtain the certain difference frequency signal, indicating resonance, utilizing a single heterodyner (mixer) wherein the resonance signals are mixed with the low frequency variable oscillator frequency.

Referring now to FIG. 5 there is shown another embodiment of the present invention. A sample of matter 49 which it is desired to analyze is placed within or allowed to pass through a D.C. polarizing field produced by magnet 51. A detecting coil 52 is wound around the sample of matter 49 such that the longitudinal axis of the coil is at right angles to the direction of the polarizing magnetic field. A transmitter coil 53 with its longitudinal axis at right angles to the axis of the detector coil 52 and to the direction of the polarizing magnetic field, is placed close to the sample of matter 49. The transmitter coil 49 is excited with electromagnetic energy derived from a wideband R.F. source 54.

In a preferred embodiment the wideband R.F. source 54 also supplies exciting energy to a similar transmitter coil 55 which is positioned in close proximity to a second reference sample of matter 56. A second detector coil 57 is positioned enveloping the sample of matter 56 and has its longitudinal axis positioned at right angles to the direction of its polarizing magnetic field.

A field bias coil 58 is shown positioned with its longitudinal axis substantially in alignment with the direction of the polarizing magnetic field and derives its exciting current from a bias field generator 59. The bias field generator 59 and associated coil 58 serve to provide a D.C. bias magnetic field which is superimposed upon the D.C. polarizing field such that the total polarizing magnetic field over the sample of matter 49 can be independently controlled whereby the magnetic field intensity over one of the samples can be made substantially different than the field over the other sample.

The output of detector coil 52 is coupled to the input of an amplifier 61. Likewise, the detector coil 57 is coupled to the input of an amplifier 62. The outputs of amplifiers 61 and 62 are fed to the input of a mixer 63 wherein they are heterodyned to produce sum and difference frequency components in the output of mixer 63. The difference or low frequency components of the output of mixer 63 are selected and fed to a recorder 64 wherein they are recorded. The recording is fed to a Fourier analyzer 65. The Fourier analyzer 65 breaks down the output of mixer 63 into its separate frequency components, integrates these components and feeds this information to a recorder 66 wherein it is recorded.

In operation the unknown sample 49 is placed within the magnetic field and a known sample having a single narrow resonant line is placed within the detector coil 57. The wideband R.F. signal, applied via transmitter coil 53 to both samples 49 and 56, will produce gyromagnetic resonance of all the gyromagnetic bodies within both samples of matter.

The polarizing field over the sample 49 is adjusted via bias field generator 59 such that the gyromagnetic resonance spectrum of the sample 49 is displaced in frequency from the single reference resonance of the gyromagnetic sample 56 by some convenient frequency which may, for example, be in the order of a kilocycle. When the gyromagnetic signals are heterodyned in mixer 63, sum and difference components are produced. The difference frequency components of the output of mixer 63 are selected as by filter or by the narrow bandwidth of the recorder 64 and are recorded thereby.

The recording which may be, for example, photographic or magnetic is then processed, if required, and the recorded information retrieved and passed through a Fourier analyzer 65 which will be more fully described below with reference to FIGS. 6 and 7. The advantage of recording the gyromagnetic difference frequency spectrum arises because it facilitates either a simultaneous or more rapid integration of the several gyromagnetic resonances, as will become more apparent from the description, below.

In the Fourier analyzer 65 the various Fourier components, making up the gyromagnetic spectrum, are integrated over the entire time of the recording thereby obtaining a greatly enhanced signal-to-noise ratio. This signal-to-noise enhancement occurs due to the phase coherent and continuous characteristic of the gyromagnetic signal whereas individual noise signals have intermittent and non-phase coherent characteristics. From well-known information theory it can be shown that the gyromagnetic signal will be enhanced in amplitude by the first power of the time the signal is recorded, whereas the noise will be enhanced only by the square root of the time that the noise is recorded. The integrated Fourier components making up the output of the Fourier analyzer 65 are then recorded by recorder 66 wherein the amplitude of the integrated Fourier components may be recorded as a function of frequency or time, as desired.

Although in the preferred embodiment of FIG. 5 a reference sample 56 has been provided and subjected to the same polarizing field to thereby produce an extremely stable R.F. reference signal for heterodyning with the gyromagnetic spectrum, the reference sample and associated elements could be replaced with an extremely stable R.F. source such as, for example, a crystal controlled oscillator, not shown.

Referring now to FIG. 6 there is shown one specific embodiment of the recorder 84 and Fourier analyzer 85. In this embodiment the output of mixer 63, containing the difference frequency spectrum, is fed to an optical transducer such as, for example, an intensity modulated source wherein the difference frequency spectrum is transformed into intensity modulated light which is then recorded or stored on film for a certain length of time in a photographic recorder 68.

The photographic recorder 68 may comprise a thin slit through which the light from the optical transducer is shown upon a moving strip of photographic film such that the intensity modulated light is recorded or stored upon the film for a certain length of time. The length of the film strip may be any convenient size keeping in mind suitable resolution. A typical film strip may be, for example, 2 to 3 inches in length.

The film is processed and utilized as a diffraction grating in an optical spectrograph 69 such as a Bausch and Lomb Model 500 recorder spectrophotometer or a Cenco grating spectrograph. The optical spectrograph serves to break the intensity modulation, superimposed upon the film, into its Fourier components which may then be recorded upon a second piece of film or merely focused at a certain focal plane. The output of the optical spectrograph 69 is then analyzed from the film, or if desired, from the focal plane within the spectrograph by a photoelectric densitometer 71 such as the Baird Atomic densitometer comparator. The photoelectric densitometer determines the relative amplitude and frequencies of the various Fourier components. The output of the photoelectric densitometer is fed to recorder 66.

Referring now to FIG. 7 there is shown an embodiment of the present invention relating specifically to another type of Fourier analyzer 95 as could be utilized with the equipment shown in FIG. 5. The output of mixer 63 is fed to a magnetic recorder 72 wherein the difference frequency gyromagnetic spectrum is recorded or stored for a certain length of time on a magnetic medium or memory such as, for example, magnetic tape.

The magnetic recording is then processed by securing together the start and finish of the recording to thereby form a continuous recording. The continuous recording is then played back in playback 73. The output of playback 73 is fed to the input of a mixer 74 wherein the continuous gyromagnetic spectrum signal is heterodyned with a signal from a stable, tunable oscillator 75 to obtain a difference frequency spectrum which is fed to a narrow band filter 76.

Narrow band filter 76 is designed to have an extremely narrow pass band, such as, for example, a single cycle at some convenient center frequency such as, for example, one kilocycle. The frequency of the oscillator 75 is selected such as to give a difference frequency of one kilocycle when heterodyned with an expected Fourier component of the gyromagnetic spectrum. The one kilocycle signal output of the narrow band filter 76, if any, is fed to a detector 77 which serves to detect the amplitude of the signals passed by narrow band filter 76. The output of the detector 77 is fed to a recorder 66.

The narrow band filter 76 and detector 77 could be replaced by a low pass filter designed to pass D.C. signals. The variable oscillator would then have its frequency range selected to successively coincide in frequency with the various Fourier components in the output of playback 73 to thereby produce, in the output of mixer 74, a D.C. signal, at coincidence, which would then be recorded by recorder 66.

In operation, the continuous magnetic recording is played back by playback 73 to produce a continuous signal which represents the difference frequency gyromagnetic spectrum. During one revolution of the magnetic recording the frequency of the variable frequency oscillator 75 is kept constant at a particular frequency which will produce the certain difference frequency in the output of the mixer 74, that is, at the pass band of the narrow band filter 76.

Thus, after one complete revolution of the recording the detector will have detected all of the signal and/or noise occurring during the duration of the recording or storage at the predetermined frequency which produces the difference frequency passable by the narrow band filter 76. Since noise signals occur sporadically and with noncoherent phase relationships the output of the detector will be substantially greater for a substantial length of time if the detector is detecting a gyromagnetic signal rather than noise.

After the continuous recording has been searched for a gyromagnetic signal at a particular frequency the frequency of the variable oscillator is changed to a new frequency and the entire recording is replayed thereby searching the recording for a gyromagnetic signal at the new frequency. In this manner the entire recording may be searched throughout the expected frequency and all of the gyromagnetic signals recorded.

An enhancement of the signal-to-noise ratio is obtained at the expense of time required to Fourier analyze the recording. However, the time required to analyze the recording is minimized by increasing the rate at which the recording is played back. For example, by decreasing the playback time by one thousand the difference frequency gyromagnetic resonance spectrum, as applied to the input of mixer 74, is translated to frequencies in the order of 1,000 times higher. A gyromagnetic spectrum having a center frequency of a kilocycle is translated to a new frequency band having a center frequency of a megacycle. The variable frequency oscillator 75 is then selected to have a frequency such as to produce the center frequency of the narrow pass band filter 76.

The variable frequency oscillator 75, when operating at the increased frequency, is swept in frequency through the expected spectrum at a relatively fast rate such that its frequency changes by an increment in the order of an expected gyromagnetic line width, at the increased frequency, for each revolution of the recording.

It is readily apparent to those skilled in the art that the elements of FIG. 7 comprising the playback 73 and variable oscillator 75 may be altered such that the variable oscillator 75 is tuned to a certain fixed frequency and the rate at which the record is played back, that is, the revolutions per minute or second are varied to produce the sweep of the difference frequency in the output of mixer 74.

One such arrangement includes a fly wheel coupled to the playback 73 in such a manner that the revolutions of the recording are a function of the revolutions of the fly wheel. The fly wheel is taken up to a certain angular velocity and the frequency of the fixed oscillator adjusted to produce the desired difference frequency. The driving power is then removed from the fly wheel letting it coast, due to its own inertia, or damped if desired, gradually slowing down at a uniform rate to thereby produce the necessary sweep of the difference frequency in the output of mixer 74.

Although the present invention has been shown and described as it is utilized with a crossed coils nuclear magnetic resonance system, other gyromagnetic systems, for example, the single coil twin T bridge or various single coil absorption systems, may be utilized to detect and apply the gyromagnetic resonance signals as taught by the present invention.

Moreover, the present invention has been described utilizing an R.F. source for exciting gyromagnetic resonance of the gyromagnetic bodies but it is readily apparent to those skilled in the art that resonance may also be excited in a number of other ways, such as, for example, by free precession techniques taught by Russell H. Varian in U.S. Patent Re. 23,769 entitled "Method and Means for Correlating Nuclear Properties of Atoms and Magnetic Fields," issued January 12, 1954.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. The method of employing gyromagnetic precession in a polarizing field for the control of a process which comprises passing at least a portion of one of the substances of the process through the coupled portions of the output-input networks of a gyromagnetic oscillator, taking a portion of the output signal, if any, emanating from the gyromagnetic oscillator, and deriving from said output signal a control signal for controlling certain portions of the process.

2. The method of measuring gyromagnetic properties of matter which comprises the steps of exciting simultaneous gyromagnetic resonance of matter having a plurality of gyromagnetic resonance lines disposed within uniform polarizing field portions having like variations with time, simultaneously receiving simultaneous gyromagnetic resonance line signals, heterodyning the gyromagnetic resonance line signals with a reference signal to obtain a low frequency gyromagnetic resonance difference signal containing the simultaneous plural gyromagnetic resonance components, recording the difference gyromagnetic resonance signal having simultaneous plural resonance lines for a certain length of time, Fourier analyzing the recorded signal to obtain the Fourier components thereof, integrating the Fourier components for a certain length of time to thereby obtain an enhanced sensitivity of the gyromagnetic measurment.

3. The method of measuring gyromagnetic properties of matter which comprises the steps of exciting simultaneous gyromagnetic resonance of a plurality of gyromagnetic resonant lines in a sample of matter under investigation disposed within a uniform magnetic field, simultaneously receiving the plural resonance line signals of the gyromagnetic resonance spectrum signal having a plurality of excited simultaneous resonant lines, recording a spectrum signal having plural simultaneous resonance lines in variable accordance with the gyromagnetic resonance spectrum for a certain length of time, Fourier analyzing the recorded signal to obtain the Fourier components thereof, integrating the Fourier components for a certain length of time to thereby obtain an enhanced sensitivity of the gyromagnetic measuring apparatus.

4. The method according to claim 3 including the steps of comparing the received gyromagnetic resonance spectrum signal with a stable frequency to thereby obtain a lower frequency gyromagnetic resonance spectrum signal having simultaneous plural resonance lines in variable acordance with the gyromagnetic resonance.

5. The method according to claim 4 wherein the step of recording the gyromagnetic resonance signal comprises the steps of transposing the lower frequency electromagnetic gyromagnetic spectrum into modulated light intensity representative of the simultaneously excited resonance lines of the sample of matter, photographically recording the modulated light intensity, and wherein the step of Fourier analyzing the recording comprises the steps of using the photographic recording as a diffraction grating to thereby obtain the Fourier components of the amplitude modulated light intensity, determining the frequency and amplitude of the various Fourier components, and recording the amplitudes and frequencies of the various Fourier components to thereby obtain a recording of the gyromagnetic resonance spectrum.

6. The method according to claim 4 wherein the step of recording the gyromagnetic resonance spectrum signal comprises the step of magnetically recording the signal, and wherein the step of Fourier analyzing the recorded signal comprises the steps of repetitively playing back the magnetic recording, comparing the playback signal with a known frequency to thereby obtain a certain difference signal, and recording the certain difference signal to thereby enhance the sensitivity of the gyromagnetic resonance measurements.

7. Apparatus employing gyromagnetic precession in a polarizing field for the control of a process comprising an input circuit and an output circuit coupled together through the polarizing field substantially only by gyromagnetic resonance, if any, of a substance forming a portion of the process, means for passing said substance through said coupled input and output circuits, amplifier means coupled to said circuits for regeneratively coupling said circuits to provide sustained oscillation at the gyromagnetic resonant frequency, if any, and means for deriving from the changes in the oscillation in variable accordance with changes in the substance, if any, a process control signal, and means forming a process control servomechanism responsive to said control signal for controlling conditions of said process.

8. Apparatus for measuring gyromagnetic properties of matter comprising, means for exciting simultaneous gyromagnetic resonance of gyromagnetic resonance lines of a pair of samples disposed within uniform polarizing field portions having like variations with time, means for simultaneously receiving the plurality of excited gyromagnetic resonance line signals from the samples, means for comparing the received gyromagnetic resonance signals from one sample with the resonance signal from the other sample to obtain plural simultaneous resonance line signals in variable accordance with the difference between the gyromagnetic resonances, if any, means for simultaneously recording plural resonance line signal of the difference gyromagnetic resonance signal for a certain length of time, means for Fourier anlyzing the recorded signal to obtain the Fourier components thereof, means for integrating the Fourier components for a certain length of time to thereby obtain an enhanced sensitivity of the gyromagnetic measuring apparatus.

9. The method according to claim 2, wherein the step of exciting simultaneous resonance of matter comprises the step of exciting simultaneous resonance of two samples of matter and wherein the step of receiving the resonance line signals comprises the step of simultaneously receiving gyromagnetic resonance line signals from the two samples of matter, and wherein the step of heterodying the resonance line signals with a reference signal comprises the step of heterodyning the resonance line signals derived from one sample with the resonance line signal derived from the other sample of matter to obtain the signal in variable accordance with the difference between the gyromagnetic resonances of the two samples.

10. The method of measuring resonance properties of matter which comprises the steps of, exciting simultaneous resonance of a plurality of resonance lines within a sample of matter under analysis disposed within a uniform polarizing magnetic field, simultaneously receiving the plural resonance line signal spectrum of the sample of matter under analysis having plural simultaneously excited resonance line signals, frequency analyzing the received resonance spectrum having plural simultaneous line signals to separate the plurality of separate resonance line components of the resonance signal spectrum at different frequencies, and measuring the relative amplitude of the separate resonance line components whereby enhanced sensitivity for the resonance measurement is obtained.

11. The method according to claim 10 including the step of recording the received resonance spectrum signal having plural simultaneously excited resonance line signals therein for a certain length of time in a storage medium, and wherein the step of frequency analyzing the received resonance spectrum comprises the step of frequency analyzing the stored resonance spectrum signal.

12. The method of determining gyromagnetic properties of matter which comprises the steps of, immersing a sample of matter containing plural gyromagnetic resonance lines to be examined in a polarizing magnetic field, applying to the sample a known and predetermined spectrum of alternating magnetic fields having a bandwidth wide enough to cover the to be examined plural resonance lines of the sample to excite simultaneous plural gyromagnetic resonance lines of the sample under analysis, simultaneously receiving the composite signal containing the excited plural resonance line signals of the gyromagnetic resonance signal of the gyromagnetic bodies contained within the sample of matter under analysis, analyzing the received composite gyromagnetic resonance spectrum signal to separate the plural resonance signal line components at different frequencies from the composite resonance signal, and recording the separated resonance line components whereby enhanced sensitivity of the gyromagnetic resonance determination is obtained for a given resonance signal receiving time.

13. The method according to claim 12 including the step of integrating the separated resonance line components for a certain length of time to obtain improved signal-to-noise ratio for the separate resonance line components making up the gyromagnetic resonance spectrum of the sample under analysis.

14. The method according to claim 12 including the step of storing the received gyromagnetic signal spectrum having plural simultaneous resonance line signals therein and wherein the step of analyzing the received resonance spectrum comprises analyzing the received and stored resonance spectrum.

15. Apparatus for determining gyromagnetic resonance properties of matter including, means for immersing a sample of matter containing gyromagnetic bodies to be examined in a polarizing magnetic fieeld, means for generating and applying a known and predetermined spectrum of alternating magnetic fields having a bandwidth wide enough to cover the to be examined plural resonance lines at different frequencies of the sample under investigation to simultaneously excite gyromagnetic resonance of plural gyromagnetic resonance lines of the bodies within said sample of matter under investigation, means for simultaneously receiving the plural excited gyromagnetic resonance line signals to provide a composite detected resonance signal of the gyromagnetic bodies contained within the sample of matter under investigation, means for frequency analyzing the received gyromagnetic resonance composite signal to separate the plurality of separate resonance line components, and means for recording the separate resonance line components whereby enhanced sensitivity of the gyromagnetic determination is obtained for a given receiving time.

16. The apparatus according to claim 15 including a second recording means for storing thee composite resonancee signal in a memory medium for a certain length of time, and wherein said frequency analyzing means is operative upon said stored composite signal.

17. The apparatus according to claim 16 including means for integrating the resonance line components for a certain length of time to obtain outputs representative of the relative amplitudes of the separate reesonance line components making up the gyromagnetic resonance spectrum of the sample under investigation.

18. The apparatus according to claim 15 wherein said means for generating and applying the predetermined spectrum of alternating magnetic fields to the sample under analysis includes a pulse generator with its pulses regulated to give Fourier components over the pedetermined spectrum.

19. Apparatus for determining gyromagnetic resonance properties of matter including, means for immersing a sample of matter containing gyromagnetic bodies to be examined in a uniform polarizing magnetic field, means for generating and applying a known and predetermined spectrum of alternating magnetic fields having a bandwidth wide enough to cover the to be examined plural resonance lines at different frequencies of the sample under investigation to simultaneously excite gyromagnetic resonances of the plural gyromagnetic resonance lines of the bodies within said sample of matter under investigation, means for simultaneously receiving the plural excited gyromagnetic resonance line signals to provide a composite detected resonance signal of the gyromagnetic bodies contained within the sample of matter under investigation, means for recording the composite gyromagnetic resonance signal for a certain length of time to enable subsequent analysis thereof to obtain the separate resonance signals therefrom, whereby enhanced sensitivity of the gyromagnetic resonance determination is obtained for a given receiving time.

20. The apparatus according to claim 19 wherein said means for recording the composite gyromagnetic resonance signal includes a photographic recording means; and including, means for frequency analyzing the photograhically recorded composite gyromagnetic resonance signal to separate the various resonance signal components from the photographic recording, means for integrating the separated resonance components, and photo-electric densitometer means for determining the integrated amplitudes of the various resonant components.

21. The apparatus according to claim 19 wherein said means for recording the composite gyromagnetic resonance signal comprises means for magnetically storing said composite signal.

References Cited by the Examiner

UNITED STATES PATENTS

| | | | |
|---|---|---|---|
| 2,212,799 | 8/1940 | Sperry | 235—61.6 |
| 2,589,494 | 3/1952 | Hershberger | 324—0.5 X |
| 2,602,835 | 7/1952 | Hershberger | 324—58.5 |
| 2,764,676 | 9/1956 | Bradley | 324—0.5 X |
| 2,820,173 | 1/1958 | Raabe | 235—181 X |
| 2,820,944 | 1/1958 | Bradley | 324—0.5 |
| 2,911,587 | 11/1959 | Bayly | 324—0.5 |
| 3,113,263 | 12/1963 | Collins | 324—0.5 |

OTHER REFERENCES

Robe, Food Processing, vol. 17, No. 4, April 1956, pp. 20, 21, 61, and 62.

Suryan, Physical Review, vol. 80, page 119, 1950.

WALTER L. CARLSON, *Primary Examiner.*

MAYNARD R. WILBUR, *Examiner.*

CHESTER L. JUSTUS, R. A. FARLEY A. E. RICHMOND, *Assistant Examiners.*